United States Patent [19]

Grosbois et al.

[11] Patent Number: 4,499,063

[45] Date of Patent: Feb. 12, 1985

[54] PREPARATION OF SILANE, SIH4

[75] Inventors: Jean Grosbois, L'Isle Adam; Serge Jacubert, Viroflay; Jean-Michel Verdier, Paris, all of France

[73] Assignee: Rhone-Poulenc Specialities Chimiques, Courbevoie, France

[21] Appl. No.: 536,240

[22] Filed: Sep. 27, 1983

[30] Foreign Application Priority Data

Sep. 30, 1982 [FR] France .................... 82 16434

[51] Int. Cl.$^3$ ............................................ C01B 33/04
[52] U.S. Cl. .............................. 423/347; 423/DIG. 12
[58] Field of Search ........................ 423/347, DIG. 12

[56] References Cited

U.S. PATENT DOCUMENTS

| | | | |
|---|---|---|---|
| 3,078,218 | 2/1963 | Sundermeyer | 204/61 |
| 3,163,590 | 12/1964 | Litz et al. | 423/347 |
| 4,041,136 | 8/1977 | Franklin et al. | 423/347 |
| 4,405,591 | 9/1983 | Grosbois et al. | 423/347 |

*Primary Examiner*—John Doll
*Assistant Examiner*—Steven Capella
*Attorney, Agent, or Firm*—Burns, Doane, Swecker & Mathis

[57] ABSTRACT

Essentially pure silane, SiH4, is facilely prepared in plural reactors, by (i) reacting chlorosilane with lithium hydride in a mixture of molten salts which comprises lithium chloride and potassium chloride, in a discrete first reaction zone, said mixture of molten salts being essentially eutectic in composition, the amount of chlorosilane being at least 5% less than that amount stoichiometrically required for reaction with the lithium hydride, and the amount of lithium hydride comprising at most 20 mole % of said mixture of molten salts, (ii) recovering product silane from said discrete first reaction zone, (iii) transferring said mixture of molten salts comprising unreacted lithium hydride dissolved therein from said discrete first reaction zone to a discrete second reaction zone, (iv) reacting chlorosilane with said unreacted lithium hydride dissolved in said mixture of molten salts in said discrete second reaction zone, the amount of chlorosilane being at least 2% in excess of that amount stoichiometrically required for reaction with said unreacted lithium hydride, and (v) recovering product silane from said discrete second reaction zone.

14 Claims, 2 Drawing Figures

PREPARATION OF SILANE, SIH₄

BACKGROUND OF THE INVENTION

1. Field of the Invention

The present invention relates to process and apparatus for the preparation of pure silane by reacting chlorosilanes with lithium hydride.

2. Description of the Prior Art

It is known to this art to react chlorosilanes with lithium hydride to prepare silane. Compare, for example, U.S. Pat. Nos. 3,078,218 and 3,163,590.

The subject chemical reaction may thus be represented as:

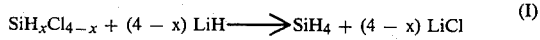

$$SiH_xCl_{4-x} + (4 - x) LiH \longrightarrow SiH_4 + (4 - x) LiCl \qquad (I)$$

Insofar as the chlorosilane starting materials are concerned, preferably $HSiCl_3$ and/or $SiCl_4$ are used, which correspond to $x=1$ and 0. The reaction takes place in a medium of molten salts at a temperature on the order of 400° to 500° C.

The processes described in the aforenoted domestic patents, however, do not permit of the preparation of a sufficiently pure silane, and, furthermore, the by-product salts contain appreciable amounts of lithium hydride which prevents their ultimate recycling without first being subjected to appropriate preliminary treatment.

SUMMARY OF THE INVENTION

Accordingly, a major object of the present invention is the provision of an improved process for the preparation of essentially pure silane, i.e., a silane essentially completely free of unreacted chlorosilane starting materials, and which process is conspicuously devoid of those disadvantages and drawbacks to date characterizing the state of this art. Also, the molten salt reaction medium utilized therefor may be directly immediately recycled, or otherwise directly used, without the need for any preliminary purification thereof.

Briefly, the present invention features a process for the preparation of silane by reacting chlorosilanes with lithium hydride in a reaction mixture comprised of molten salts having a composition approximately that of the eutectic composition thereof, characterized in that the reaction medium is a mixture of molten salts comprising lithium chloride, potassium chloride and, optionally, at least one other alkali or alkaline earth metal chloride, and that the reaction is carried out in two distinct stages, a first stage (i) wherein the reaction between the chlorosilanes and the lithium hydride is conducted in the mixture of molten salts by employing an amount of chlorosilanes that is stoichiometrically deficient with respect to that amount required for complete reaction with the lithium hydride, preferably in a deficit of from 5 to 20% with respect to said stoichiometric amount [in this first stage (i) the amount of lithium hydride used comprises at most 20 mole %, and preferably from 12 to 18 mole % with respect to the mixture of molten salts], and a second stage (ii) wherein the reaction between the unreacted lithium hydride emanating from the first stage, dissolved in the mixture of molten salts, and the chlorosilanes is carried out by using an amount of chlorosilanes in excess of the stoichiometric amount required for complete reaction with said lithium hydride, such excess constituting at least 2% and preferably 2 to 10% with respect to said stoichiometric amount.

DETAILED DESCRIPTION OF THE INVENTION

Figure 1:
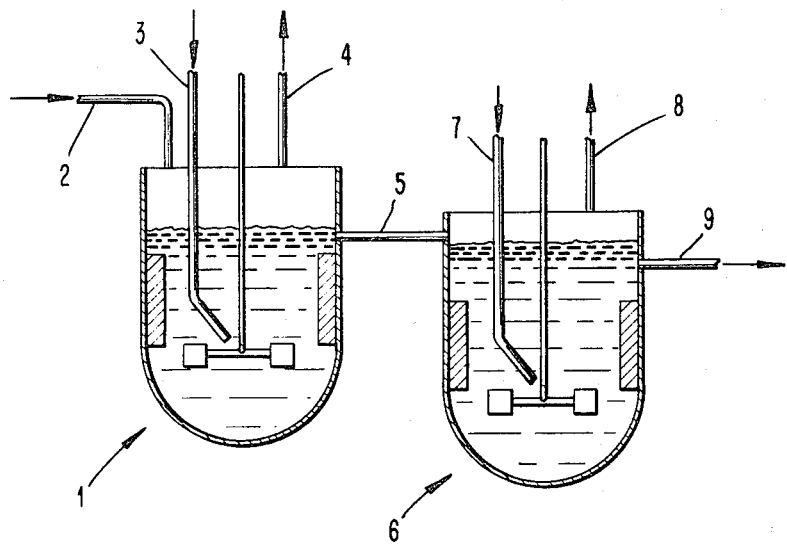
FIG. 1 is a cross-sectional schematic illustration of one embodiment of the process/apparatus according to the invention.

More particularly according to the present invention, the mixture of molten salts comprising the reaction medium essentially consists of lithium chloride, potassium chloride and, optionally, at least one other alkali or alkaline earth metal chloride. The alkali or alkaline earth metal chlorides are preferably selected from among the chlorides of sodium, rubidium, strontium, magnesium, calcium and barium. In one embodiment of the invention, binary mixtures containing lithium chloride and potassium chloride, or ternary mixtures containing lithium chloride, potassium chloride and either calcium chloride or barium chloride, are advantageously employed.

The composition of the mixtures of molten salts used according to the process of the invention is approximately that of the eutectic composition of said mixtures. In the first stage (i) of the process of the invention, mixtures of molten salts are preferably employed, which initially are deficient vis-a-vis the eutectic composition in lithium chloride up to a maximum of 10 mole %. At the outlet of the second stage (ii), the composition of the mixture of molten salts preferably has an excess of lithium chloride up to a maximum of 10 mole % vis-a-vis the eutectic composition.

The amount of lithium hydride used in the first stage constitutes at most 20 mole % and preferably 12 to 18 mole % with respect to the mixture of molten salts. The initial amount of lithium hydride, which upon completion of the two stages of the subject process is completely converted into lithium chloride, is limited in light of the maximum deficit and excess in lithium chloride in the mixture of molten salts set forth immediately above.

According to the process of the invention, the temperature of the reaction between the chlorosilanes and the lithium hydride in the first and second stages advantageously ranges from 350° C. to 410° C. If this temperature is too low, partial crystallization of the mixture of molten salts may occur, and if this temperature is too high, partial cracking of the silane may take place.

In another embodiment of the process of the invention, the preparation of the silane may be carried out by replacing the lithium hydride with a mixture of lithium hydride and calcium hydride.

This invention also features suitable apparatus that may be used for carrying out the subject process, said apparatus being characterized in that it comprises two agitated reactors and means to separate the gaseous mixture discharged from the second reactor.

The first reactor is supplied with the chlorosilanes and the lithium hydride in the mixture of molten salts; from this first reactor are withdrawn, on the one hand, the silane produced and, on the other, an admixture comprising the mixture of molten salts and the unreacted lithium hydride.

The second reactor is supplied with the chlorosilanes and the admixture comprising the mixture of molten salts and the unreacted lithium hydride emanating from the first reactor; from this second reactor, a gaseous mixture containing silane and chlorosilanes and a mixture of molten salts free of lithium hydride is discharged.

The gaseous mixture exiting the second reactor is separated in a device which advantageously comprises a distillation column in order to recover, on the one hand, silane, and on the other, chlorosilanes which may be recycled into the first and/or the second reactor. This separating device may equally and specifically as well comprise an adsorption installation.

The invention and the advantages thereof will now be more specifically described, with reference to the two preferred embodiments thereof illustrated in the accompanying Figures of Drawing.

In the embodiment of the process/apparatus illustrated in FIG. 1, the first reactor 1 is shown, said reactor being supplied through the line 2 with a mixture of molten salts essentially consisting of lithium chloride and potassium chloride, with the composition of such mixture being deficient in lithium chloride, vis-a-vis the eutectic composition thereof, up to a maximum of 10 mole %. Such mixture further comprises a maximum of 20 mole % lithium hydride. The reactor 1 is also supplied, through the line 3, with a gaseous mixture of chlorosilanes essentially consisting of 90 mole % trichlorosilane and 10 mole % tetrachlorosilane; the amount of chlorosilanes employed represents a deficiency of at least 5% with respect to the stoichiometric amount required for complete reaction with the lithium hydride. From this reactor 1, silane free of chlorosilanes is withdrawn through the outlet 4 and a molten admixture comprising unreacted lithium hydride and the mixture of molten salts is transferred to the second reactor 6 via the line 5, with the composition of the mixture of molten salts corresponding to the composition initially introduced into the reactor 1, to which is added the amount of lithium chloride originating from the reaction between the chlorosilanes and lithium hydride.

The second reactor 6 is supplied, on the one hand, with the mixture cycled via the line 5 and, on the other, by a gaseous mixture of chlorosilanes via the line 7, the composition of which is identical to that employed in the reactor 1. The amount of chlorosilanes employed in this second reactor 6 represents an at least 2% excess with respect to that stoichiometric amount required for complete reaction with the lithium hydride. A gaseous mixture consisting of the silane produced and unreacted chlorosilanes is withdrawn from the reactor 6 through the outlet line 8. Also withdrawn, via the outlet line 9, is the mixture of molten salts, the composition of which corresponds to that introduced into the second reactor, with the amount of lithium chloride originating from the reaction between the chlorosilanes and lithium hydride being added thereto. The amount of lithium chloride contained in the mixture of molten salts constitutes an excess up to a maximum of 10 mole % with respect to the known eutectic composition of said mixture. The mixture withdrawn via the line 9 may contain fine silicon particles dispersed in said mixture; these particles are advantageously eliminated by filtration.

The gaseous mixture discharged through the outlet line 8 of the reactor 6 is subjected to a downstream distillation to separate the chlorosilanes from the silane desired product.

Figure 2:
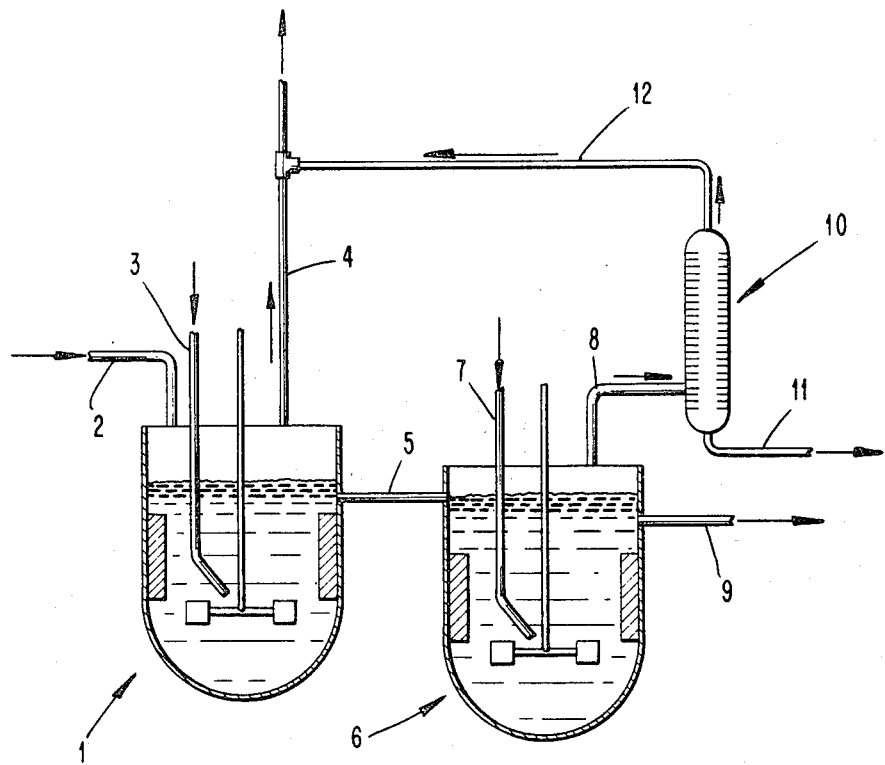
FIG. 2 is a cross-sectional schematic illustration of another embodiment of the process/apparatus according to the invention.

In the embodiment of the process/apparatus illustrated in FIG. 2, the process is again carried out in the two reactors 1 and 6, which are agitated. The first reactor 1 is maintained at a temperature of 390° C. and the second reactor 6 at 400° C. The agitation of the reactor contents is effected by means of a Rushton turbine with 6 straight blades, with the velocity at the end of the agitator blade being 2 m/s. Gases are provided above the plane of the agitator.

The first reactor 1 is supplied with feed via the line 2 at a rate of 200 moles/hour, said feed consisting of a molten mixture containing 45.9 mole % LiCl, 36.1 mole % KCl and 18.0 mole % lithium hydride; the composition of this molten mixture reflects a deficit of 2.8 mole % of LiCl vis-a-vis the eutectic composition thereof. The first reactor 1 is additionally supplied with a gaseous feedstream, via line 3, of 9.30 moles/hour of chlorosilanes essentially consisting of 90 mole % trichlorosilane and 10 mole % tetrachlorosilane. The amount of chlorosilanes employed in this manner corresponds to a 20% deficit with respect to that amount stoichiometrically required for complete reaction between the lithium hydride introduced via the line 2 and the chlorosilanes introduced via the line 3.

A gaseous stream is withdrawn through outlet 4, consisting of silane free of chlorosilane (to the limit of detection of 10 ppm by volume), and a stream of molten salts is withdrawn from the reactor 1 via the outlet line 5, the rate of flow of said molten salts being 200 moles/hour, with the composition thereof being 60.3 mole % LiCl, 36.1 mole % KCl and 3.6 mole % LiH.

The second reactor 6 is supplied with the stream of molten salts via the conduit 5 and, via the inlet 7, with a mixture of chlorosilanes having a composition identical to that in the line 3 and at a rate of flow of 2.4 moles/hour, which corresponds to an excess of 33% vis-a-vis the stoichiometric amount required for complete reaction with the lithium hydride. The gaseous mixture discharged via outlet 8 from the second reactor 6 consists of silane and chlorosilanes; this mixture is subjected to distillation in a distillation column 10. Such distillation separates the silane final product from the chlorosilanes. The chlorosilanes withdrawn via the outlet line 11 are recycled into the apparatus and the silane is withdrawn via the line 12 and combined with the stream in the line 4 to constitute the desired final product of the apparatus. The stream of molten salts withdrawn from the second reactor 6 via outlet 9 consists of 63.9 mole % LiCl and 36.1 mole % KCl, which corresponds to a 5.1 mole % excess of LiCl vis-a-vis the eutectic composition thereof.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of essentially pure silane, comprising (i) reacting chlorosilane with lithium hydride in a mixture of molten salts which comprises lithium chloride and potassium chloride, in a discrete first reaction zone, said mixture of molten salts being essentially eutectic in composition, the amount of chlorosilane being at least 5% less than that amount stoichiometrically required for reaction with the lithium hydride, and the amount of lithium hydride comprising at most 20 mole % of said mixture of molten salts, (ii) recovering product silane from said discrete first reaction zone, (iii) transferring said mixture of molten salts comprising unreacted lithium hydride dissolved therein from said discrete first reaction zone to a discrete second reaction zone, (iv) reacting chlorosilane with said unreacted lithium hydride dissolved in said mixture of molten salts in said discrete second reaction zone, the amount of chlorosilane being at least 2% in excess of that amount stoichiometrically required for reaction with said unreacted lithium hydride, and (v) recovering product silane from said discrete second reaction zone.

2. The process as defined by claim 1, wherein said discrete first reaction zone said mixture of molten salts comprises an up to 10 mole % deficit in lithium chloride with respect to the eutectic composition thereof.

3. The process as defined by claim 2, which further comprises (vi) withdrawing said mixture of molten salts from said discrete second reaction zone, said mixture of molten salts comprising an up to 10 mole % excess in lithium chloride with respect to the eutectic composition thereof.

4. The process as defined by claim 2, wherein said discrete first reaction zone the amount of chlorosilane feed ranges from 5 to 20% less than that amount stoichiometrically required for the reaction with the lithium hydride.

5. The process as defined by claim 4, wherein said discrete first reaction zone the amount of lithium hydride comprises from 12 to 18 mole % of said mixture of molten salts.

6. The process as defined by claim 5, wherein said discrete second reaction zone the amount of chlorosilane feed ranges from 2 to 10% in excess of that amount stoichiometrically required for reaction with said unreacted lithium hydride.

7. The process as defined by claim 6, the temperature of reaction in both said discrete first and second reaction zones ranging from 350° to 410° C.

8. The process as defined by claim 7, said reactions in both said discrete first and second reaction zones being conducted under agitation.

9. The process as defined by claim 7, said chlorosilane feed in both said discrete first and second reaction zones comprising admixture of trichlorosilane and tetrachlorosilane.

10. The process as defined by claim 7, said mixture of molten salts in both said discrete first and second reaction zones comprising at least one other alkali or alkaline earth metal chloride.

11. The process as defined by claim 1, comprising reacting the chlorosilane with both lithium hydride and calcium hydride in said discrete first reaction zone.

12. The process as defined by claim 1, wherein said step (v) said product silane is recovered in admixture with unreacted chlorosilane and is thence separated therefrom.

13. The process as defined by claim 12, further comprising recycling separated unreacted chlorosilane to either or both of said discrete first and second reaction zones.

14. The process as defined by claim 12, further comprising combining the product silane recovered from both said discrete first and second reaction zones.

* * * * *